United States Patent
Ye et al.

(10) Patent No.: US 10,956,697 B2
(45) Date of Patent: Mar. 23, 2021

(54) SYSTEMS AND METHODS FOR DECODING TWO-DIMENSIONAL MATRIX SYMBOLS WITH INCOMPLETE OR ABSENT FIXED PATTERNS

(71) Applicant: COGNEX CORPORATION, Natick, MA (US)

(72) Inventors: Xiangyun Ye, Framingham, MA (US); Xianju Wang, Bedford, MA (US); James A. Negro, Arlington, MA (US)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 15/896,197

(22) Filed: Feb. 14, 2018

(65) Prior Publication Data

US 2018/0293418 A1   Oct. 11, 2018

Related U.S. Application Data

(63) Continuation of application No. 14/944,248, filed on Nov. 18, 2015, now Pat. No. 9,911,024.

(60) Provisional application No. 62/081,327, filed on Nov. 18, 2014.

(51) Int. Cl.
  *G06K 19/00*  (2006.01)
  *G06K 7/14*   (2006.01)
  *G06K 7/10*   (2006.01)

(52) U.S. Cl.
  CPC ....... *G06K 7/1443* (2013.01); *G06K 7/10732* (2013.01); *G06K 7/146* (2013.01); *G06K 7/1417* (2013.01); *G06K 7/1473* (2013.01); *G06K 7/1491* (2013.01)

(58) Field of Classification Search
  CPC .... G06K 7/1443; G06K 7/146; G06K 7/1491; G06K 14/1417; G06K 7/1473; G06K 7/10732; G06K 7/10821
  USPC ................. 235/435, 439, 454, 462
  See application file for complete search history.

(56) References Cited

U.S. PATENT DOCUMENTS

| | | |
|---|---|---|
| 7,181,066 B1 | 2/2007 | Wagman et al. |
| 8,584,950 B2 | 11/2013 | Endo |
| 9,911,024 B2 * | 3/2018 | Ye .................. G06K 7/146 |

(Continued)

FOREIGN PATENT DOCUMENTS

| | | |
|---|---|---|
| CN | 103544516 A | 1/2014 |
| JP | 2012185725 A | 9/2012 |

OTHER PUBLICATIONS

European Patent Office, Extended European Search Report, Application No. 15194910.4, dated Apr. 14, 2016, 8 pages.

(Continued)

*Primary Examiner* — Matthew Mikels
(74) *Attorney, Agent, or Firm* — Quarles & Brady LLP

(57) ABSTRACT

Systems and methods for reading a two-dimensional matrix symbol or for determining if a two-dimensional matrix symbol is decodable are disclosed. The systems and methods can include a data reading algorithm that receives an image, locates at least a portion of the data modules within the image without using a fixed pattern, fits a model of the module positions from the image, extrapolates the model resulting in predicted module positions, determines module values from the image at the predicted module positions, and extracts a binary matrix from the module values.

20 Claims, 12 Drawing Sheets

(56) References Cited

U.S. PATENT DOCUMENTS

| 2004/0020989 | A1* | 2/2004 | Muramatsu | G06K 19/06037 235/462.1 |
| 2010/0131368 | A1* | 5/2010 | Morris | G06K 7/14 705/14.65 |
| 2013/0134222 | A1 | 5/2013 | Gassier et al. | |
| 2014/0119665 | A1 | 5/2014 | Stokes et al. | |

OTHER PUBLICATIONS

European Patent Office, Extended European Search Report, Application No. 18187749.9, dated Mar. 6, 2019, 7 pages.

* cited by examiner

SYSTEMS AND METHODS FOR DECODING TWO-DIMENSIONAL MATRIX SYMBOLS WITH INCOMPLETE OR ABSENT FIXED PATTERNS

CROSS-REFERENCE TO RELATED APPLICATIONS

This application is a continuation application of U.S. patent application Ser. No. 14/944,248 filed Nov. 18, 2015, which claims priority to U.S. Provisional Patent Application No. 62/081,327, filed Nov. 18, 2014, both of which are incorporated herein in their entirety by reference for all purposes.

BACKGROUND

The present technology relates to imaging systems and methods for decoding symbols, and more specifically, to imaging systems and methods for reading two-dimensional matrix symbols with incomplete or absent fixed patterns.

Imaging systems use image acquisition devices that include image sensors to deliver information on a viewed subject. The system then interprets this information according to a variety of algorithms to perform a programmed decision-making and/or identification function. For an image to be most-effectively acquired by a sensor in the visible, and near-visible light range, the subject is typically illuminated.

Symbology reading (also commonly termed "barcode" scanning) using an image sensor, entails the aiming of an image acquisition system including optics (lenses) and a sensor (CMOS camera, CCD, etc.) at a location on an object that contains a symbol (a "barcode" for example), and acquiring an image of that symbol. The symbol contains a set of predetermined patterns that represent an ordered group of characters or shapes from which an attached data processor (for example a microcomputer) can derive useful information about the object (e.g. its serial number, type, model, price, etc.). Symbols/barcodes are available in a variety of shapes and sizes. Two of the most commonly employed symbol types used in marking and identifying objects are the so-called one-dimensional barcode, consisting of a sequence of bars and spaces of varying width, and the so-called two-dimensional barcode consisting of a two-dimensional array of dots or rectangles.

In typical symbology reading, the symbols/barcodes are identified by first locating a fixed pattern, e.g., a finder pattern. If the fixed pattern is damaged or absent, the reader cannot read the symbol. In recent attempts to deal with damaged fixed patterns, efforts have included determining a location of the corners of a rectangular symbol. However, these attempts require identifying fixed points in the symbols/barcodes and are useless if those fixed points cannot be located due to the symbol being damaged.

A need exists for improved systems and methods for decoding symbols, and in particular, to overcome the shortcomings relating to a symbol/barcode that has a damaged or absent fixed pattern.

BRIEF SUMMARY OF THE INVENTION

In one aspect, this disclosure provides a system for reading a two-dimensional matrix symbol or determining if a two-dimensional matrix symbol is decodable. The two-dimensional matrix symbol can include an incomplete fixed pattern or no fixed pattern. The two-dimensional matrix symbol can encode a data set. The system can include an imaging device and a processor. The system can optionally include a binary matrix decoder. The imaging device can be configured to acquire an image containing at least a portion of the two-dimensional matrix symbol. The processor can be operative coupled to the imaging device. The processor can be configured to execute a data reading algorithm. The data reading algorithm can receive the image, locate at least a portion of the data modules within the image without using a fixed pattern, fit a model of the module positions from the image, extrapolate the model resulting in predicted module positions, determine module values from the image at the predicted module positions, and extract a binary matrix from the module values. The binary matrix decoder can be operatively coupled to the processor. The binary matrix decoder can be configured to execute a decoding algorithm that decodes the binary matrix. The data reading algorithm can include a frequency-domain analysis.

In another aspect, this disclosure provides a method of reading a two-dimensional matrix symbol. The two-dimensional matrix symbol can include data modules each having a module value and a module position. The two-dimensional matrix symbol can include an incomplete fixed pattern or no fixed pattern. The two-dimensional matrix symbol can encode a data set. The method can include one or more of the following steps: receiving an image at a processor, the image containing at least a portion of the two-dimensional matrix symbol; locating, using the processor, at least a portion of the data modules within the image without using a fixed pattern; fitting, using the processor, a model to at least a portion of the module positions from the image; extrapolating, using the processor, the model to define predicted module positions; determining, using the processor, the module values from the image at the predicted module positions; extracting, using the processor, a binary matrix from the module values; and decoding the binary matrix.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF DRAWINGS

The invention will be better understood and features, aspects and advantages other than those set forth above will become apparent when consideration is given to the following detailed description thereof. Such detailed description makes reference to the following drawings.

Figure 1:
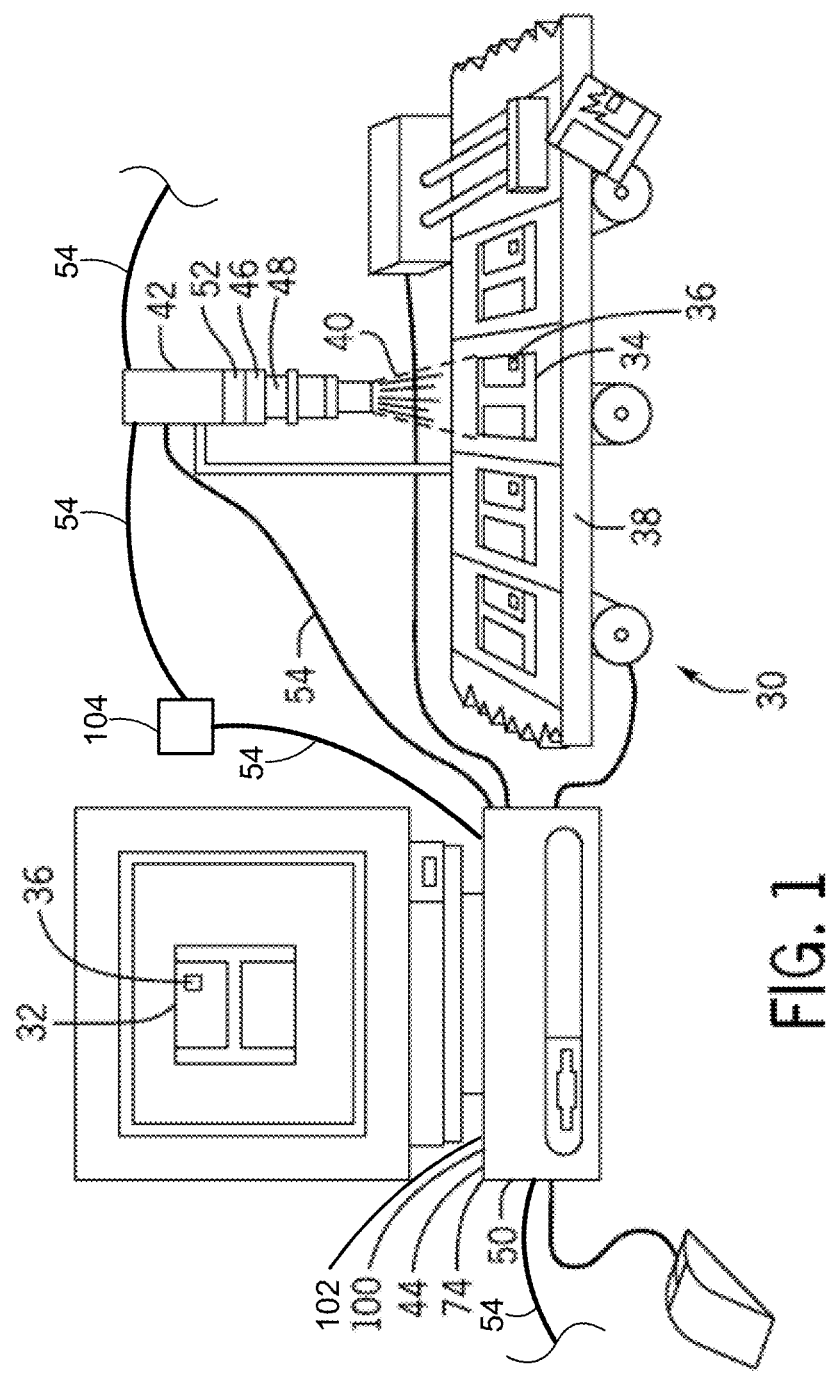
FIG. 1 is a schematic view of a typical vision system configuration including a fixed scanner for acquiring a plurality of images of an object, in accordance with the present embodiments.
Figure 2:
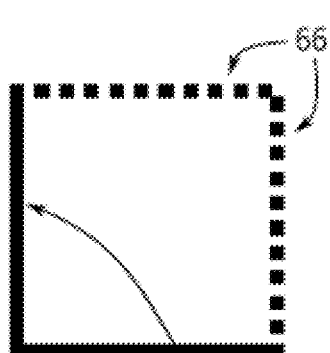
FIG. 2 is a view of certain two-dimensional matrix symbol features and styles.
Figure 3:
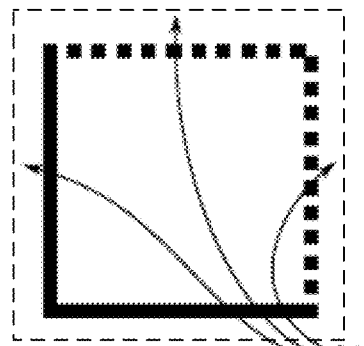
FIG. 3 is a view of certain two-dimensional matrix symbol features and styles.

While the technology is susceptible to various modifications and alternative forms, specific embodiments thereof have been shown by way of example in the drawings and are herein described in detail. It should be understood, however, that the description herein of specific embodiments is not intended to limit the technology to the particular forms disclosed, but on the contrary, the intention is to cover all modifications, equivalents, and alternatives falling within the spirit and scope of the technology as defined by the appended claims.

DETAILED DESCRIPTION OF THE INVENTION

The various aspects of the subject technology are now described with reference to the annexed drawings, wherein like reference numerals correspond to similar elements throughout the several views. It should be understood, however, that the drawings and detailed description hereafter relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system," "device" and the like are intended to refer to either hardware, a combination of hardware and software, software, or software in execution. The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques and/or programming to produce hardware, firmware, software, or any combination thereof to control an electronic based device to implement aspects detailed herein.

Unless specified or limited otherwise, the terms "connected," and "coupled" and variations thereof are used broadly and encompass both direct and indirect mountings, connections, supports, and couplings. Further, "connected" and "coupled" are not restricted to physical or mechanical connections or couplings. As used herein, unless expressly stated otherwise, "connected" means that one element/feature is directly or indirectly connected to another element/feature, and not necessarily electrically or mechanically. Likewise, unless expressly stated otherwise, "coupled" means that one element/feature is directly or indirectly coupled to another element/feature, and not necessarily electrically or mechanically.

As used herein, the term "processor" may include one or more processors and memories and/or one or more programmable hardware elements. As used herein, the term "processor" is intended to include any of types of processors, CPUs, microcontrollers, digital signal processors, or other devices capable of executing software instructions.

As used herein, the term "memory" includes a non-volatile medium, e.g., a magnetic media or hard disk, optical storage, or flash memory; a volatile medium, such as system memory, e.g., random access memory (RAM) such as DRAM, SRAM, EDO RAM, RAMBUS RAM, DR DRAM, etc.; or an installation medium, such as software media, e.g., a CD-ROM, or floppy disks, on which programs may be stored and/or data communications may be buffered. The term "memory" may also include other types of memory or combinations thereof.

As used herein, the term "fixed pattern" includes a pattern that is repeated in every symbol, which can be used to locate the symbol, and includes finder patterns, timing patterns, alignment patterns, position detection patterns, quiet zones, and the like.

As used herein, the term "module value" includes any difference between two modules that can be quantified, such as a brightness of the module with or without illumination, or a depth of the module measured by a distance sensing device, or any other means of visually representing a particular value. In certain aspects, the module values are binary between foreground and background modules.

As used herein, the term "module position" includes the location of the module relative to some fixed point in an image, such as another module or an illumination feature.

When used herein, the term "binary" shall include other non-binary embodiments, unless the context unambiguously indicates otherwise. For example, if a non-binary two-dimensional matrix symbol is being utilized, then the values that are determined and extracted from it can be non-binary. As another example, if a non-binary two-dimensional matrix symbol is being used, then decoding the binary matrix can include decoding a non-binary matrix.

Embodiments of the technology are described below by using diagrams to illustrate either the structure or processing of embodiments used to implement the embodiments of the present technology. Using the diagrams in this manner to present embodiments of the technology should not be construed as limiting of its scope. The present technology contemplates a system and method for reading two-dimensional matrix symbols that have a damaged fixed pattern or lack a fixed pattern entirely.

The various aspects of a method for reading two-dimensional matrix symbols may be described in connection with a system, the system adapted to read two-dimensional matrix symbols. That is because the features and advantages of the technology are well suited for this purpose. Still, it should be appreciated that the various aspects of the technology can be applied in other forms of imaging systems, such as handheld scanners, fixed-mount scanners, or embedded smart cameras that may benefit from a reading process having the features described herein. In addition, the various aspects of a system for reading two-dimensional matrix symbols may be described in connection with a method for reading two-dimensional matrix symbols.

FIG. 1 shows an illustrative machine vision system 30 adapted to acquire one or more images 32 of an object 34 containing a machine readable symbol 36. Conveyor 38 transports the objects 34 and causes relative movement between the objects 34 and the field of view 40 of an imaging device 42. Exemplary machine vision systems may be used in a manufacturing assembly, test, measurement, automation, and/or control application, among others, as non-limiting examples. Machine vision system 30 may use image acquisition software 44 operable to perform any of various types of image acquisitions.

Imaging device 42 can include a processor 46 used for image processing and decoding, for example. The processor 46 can be coupled to a vision sensor 48, and can either be part of the vision sensor 48, or it can be locally linked to the vision sensor 48. The processor 46 can be encoded with the image acquisition software 44, or in some aspects, the image acquisition software 44 can be run on a separate computing device 50 or processor 46. The image acquisition software 44 can be configured to, among other things, acquire multiple images within a single reading operation, control illumination, acquire image data, and process/decode the acquired image data into usable information. In certain aspects, the imaging device 42 can be a distance sensing device.

Imaging device 42 can also include a memory medium 52 coupled to the vision sensor 48 and/or the processor 46. The memory medium 52 can be used for storing scanned or processed images 32 and buffering data and communications, and the like. A communication line 54, such as a wired or wireless connections capable of transmitting images, image pixel arrays, and the like, can also be coupled to the imaging device 42, and provide a connection point to an optional computing device 50. The computing device 50 can be used for uploading and downloading scanned or processed images 32, for example. The imaging device 42 or computing device 50 can include further communication lines 54, such as wired or wireless connections capable of transmitting data, to enable transfer of decoded data. The vision system 30 can include an optional trigger input 104 coupled by a communication line 54, such as wired or wireless connections capable of transmitting a binary digital signal, to the imaging device 42 or computing device 50. It is to be appreciated that wireless communications are also contemplated. In this example, the imaging device 42 can be a conventional fixed mount scanner, handheld scanner, or embedded smart camera capable of providing high-angle and/or low-angle illumination, or a combination of high and low-angle illumination.

The imaging device 42 can also include an aimer (not shown). An aimer can be a secondary illumination system, such as a laser or LED, which can indicate a property of the imaging device 42, such as the active region of the imaging device 42. For example, the aimer can indicate a center or boundaries of the FOV of the imaging device 42.

The various aspects described herein allow reading of a two-dimensional matrix symbol including an incomplete fixed pattern or no fixed pattern. In particular, the various aspects will be described in the context of imaging and decoding two-dimensional matrix symbols. In this example, the symbol 36 is applied on a surface of the object 34. Because the object 34 may be partially covered at times, printed at the edge of a label, not illuminated properly, or for any other reason, some portions of the symbol 36 can be rendered unreadable. It should be appreciated that while the various aspects can be useful in reading a symbol having an incomplete fixed pattern or no fixed pattern, the various aspects are also suitable for reading symbols having complete fixed patterns.

Figure 4:
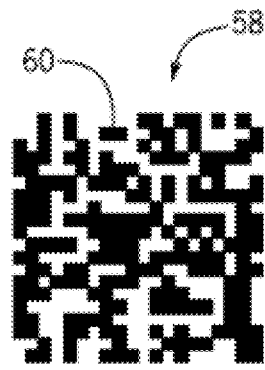
FIG. 4 is a view of certain two-dimensional matrix symbol features and styles.
Figure 5:
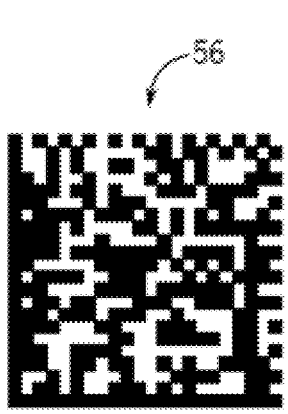
FIG. 5 is a view of certain two-dimensional matrix symbol features and styles.
Figure 6:
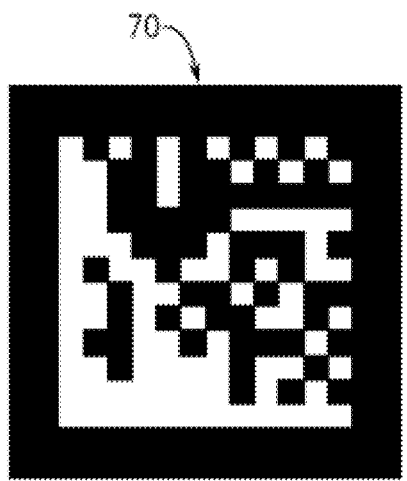
FIG. 6 is a view of certain two-dimensional matrix symbol features and styles.
Figure 7:
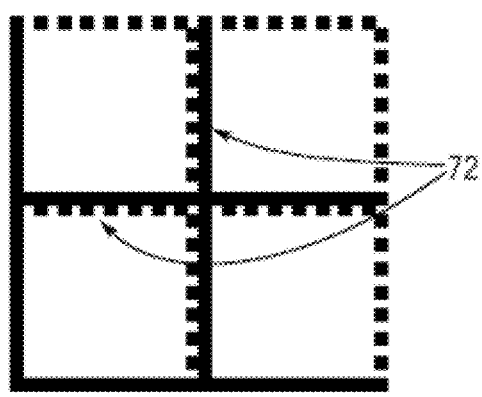
FIG. 7 is a view of certain two-dimensional matrix symbol features and styles.

Referring to FIGS. 2-7, a two-dimensional matrix symbol 56 in the form of a Data Matrix can consist of one or more data regions 58 that contain nominally square symbol modules 60 set out in a regular array. Alternatively, the symbol modules 60 can be round, such as symbol modules created by laser or dot-peening, or other shapes suitable for data storage. The data region 58 is partially surrounded by a finder pattern 62 that is generally "L" shaped, and the data region 58 can be surrounded on all four sides by a quiet zone 64. A timing pattern 66 provides a count of the number of rows and columns in the symbol 36. FIG. 5 illustrates an example of a dark-on-light two-dimensional matrix symbol 56, and FIG. 6 illustrates an example of a light-on-dark two-dimensional matrix symbol 70. In certain aspects, the two-dimensional matrix symbol is a color-based code. Examples of color-based codes include, but are not limited to High-Capacity Color Barcode (HCCB) and UltraCode. Alignment patterns 72 can also be included, and are typically used with larger grid size symbols (see FIG. 7). It is these finder patterns 62, timing patterns 66, alignment patterns 72, and the like that are damaged or missing in the two-dimensional matrix symbols that are read by the present disclosure. FIG. 4 illustrates a two-dimensional matrix symbol 56 in the form of a Data Matrix that does not have a finder pattern 62 or a timing pattern 66.

Figure 10:
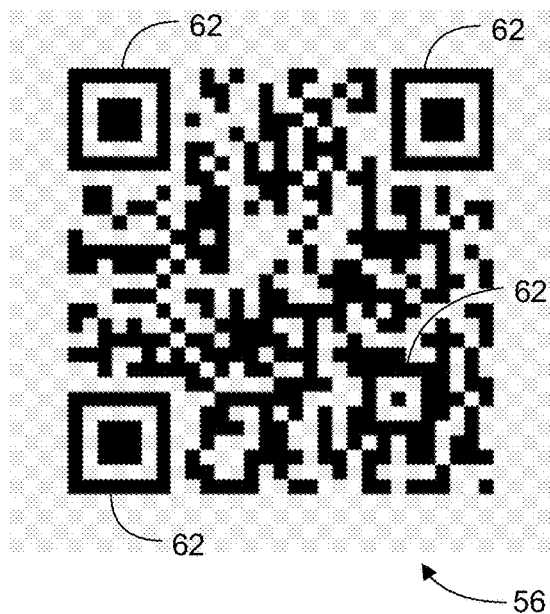
FIG. 10 is an example of a QR Code matrix symbol.
Figure 13:
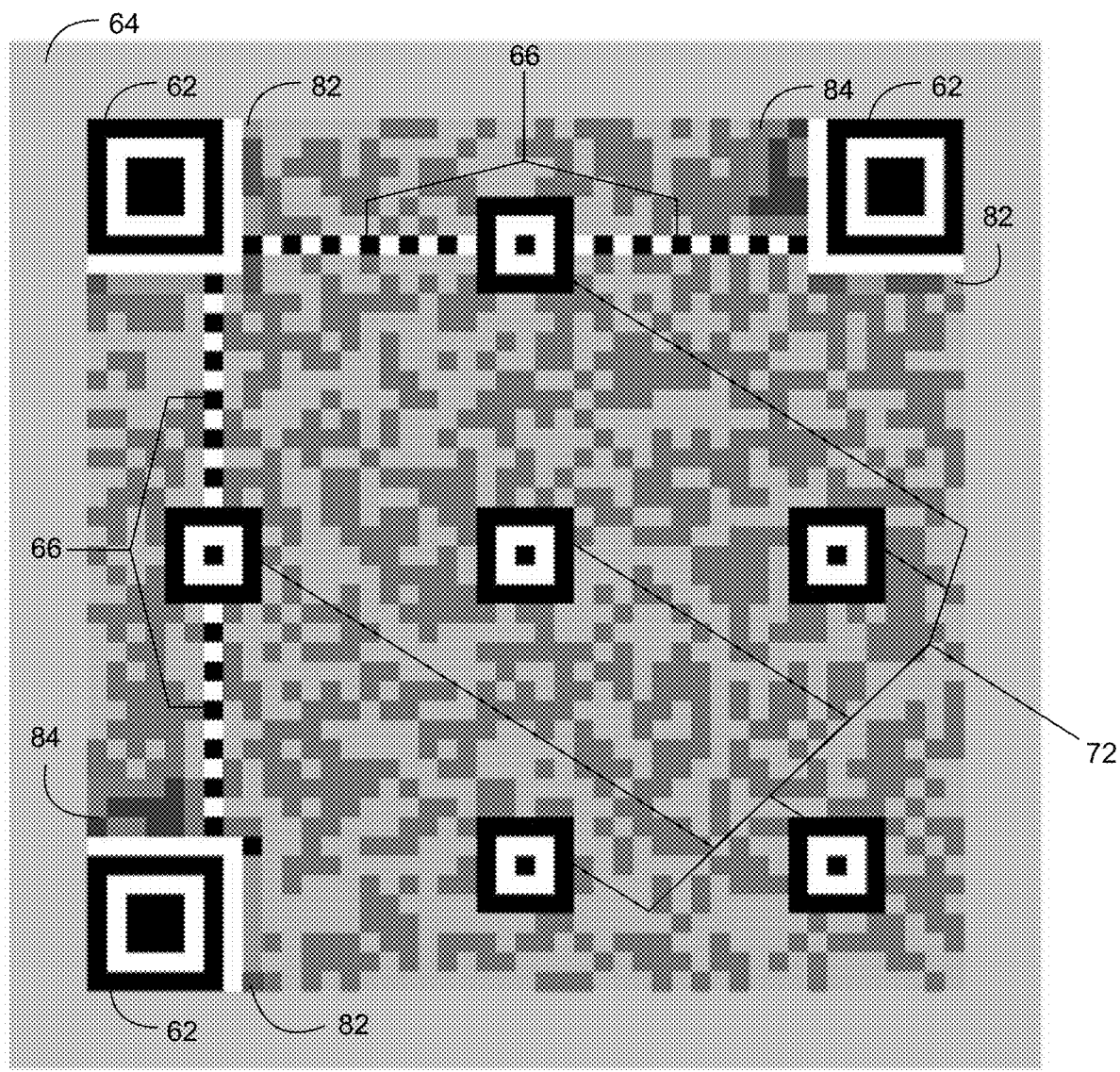
FIG. 13 is an example of a QR Code matrix symbol.

Referring to FIG. 10, a two-dimensional matrix symbol 56 in the form of a QR Code is shown with multiple finder patterns 62. Referring to FIG. 13, a two-dimensional matrix symbol 56 in the form of a QR code is shown with multiple version information areas 82, multiple format information areas 84, multiple finder patterns 62, multiple alignment patterns 72, multiple timing patterns 66, and a quiet zone 64.

Figure 11:
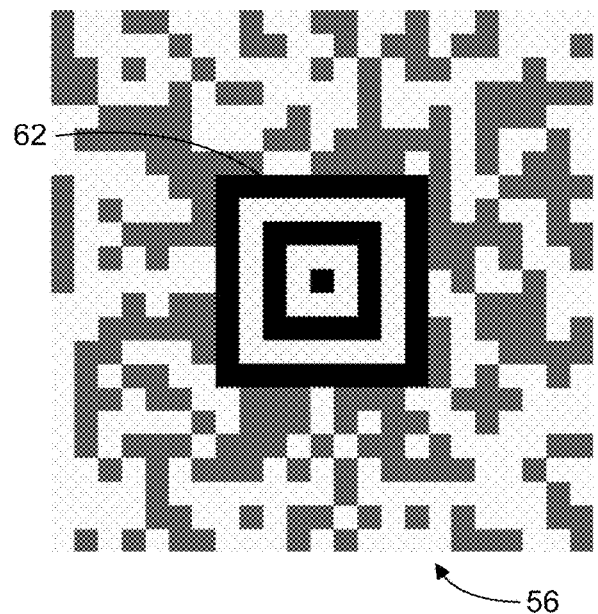
FIG. 11 is an example of an Aztec Code matrix symbol.
Figure 14:
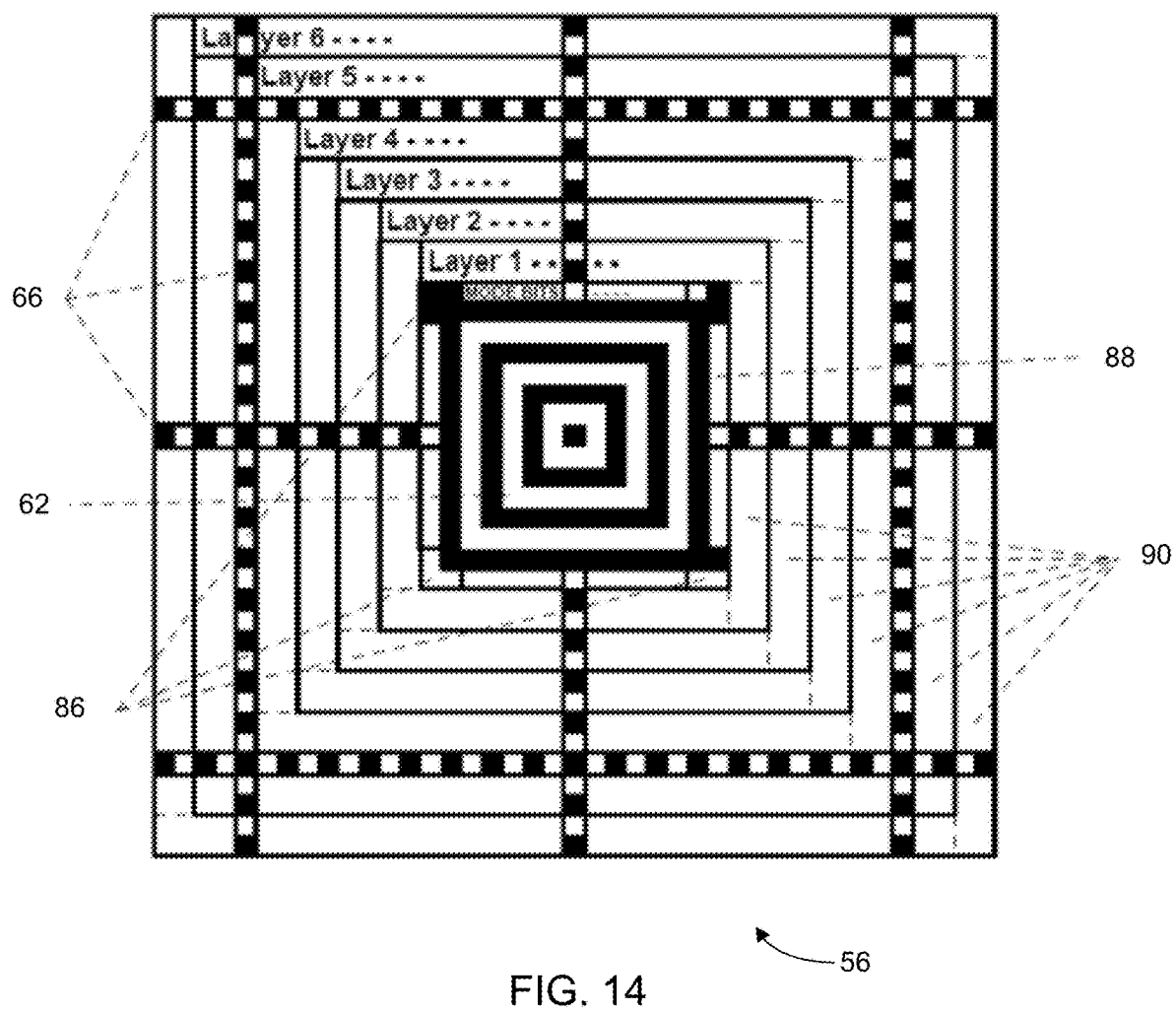
FIG. 14 is schematic of an Aztec Code matrix symbol.
Figure 15:
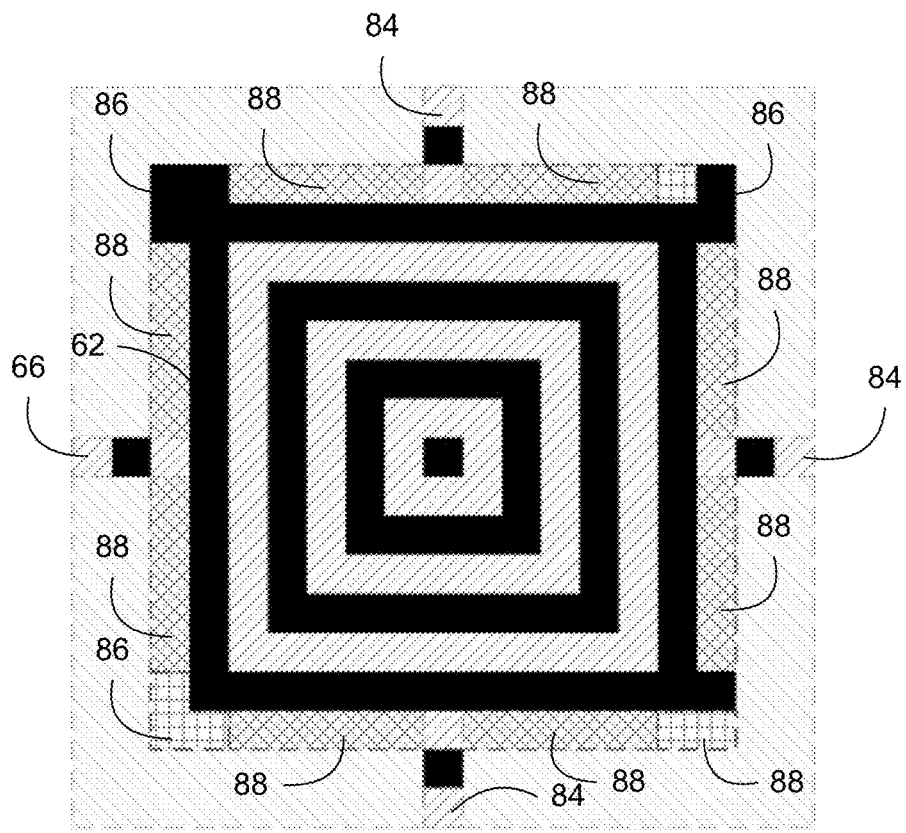
FIG. 15 is a schematic of a central portion of an Aztec Code matrix symbol.

Referring to FIG. 11, a two-dimensional matrix symbol 56 in the form of an Aztec Code is shown with a finder pattern 62 (the finder pattern 62 is emphasized by graying out the rest of the two-dimensional matrix symbol 56). Referring to FIG. 14, a two-dimensional matrix symbol 56 in the form of an Aztec Code is shown with fixed patterns including a finder pattern 62, a timing pattern 66 or reference grid, and orientation patterns 86, and variable structures including mode messages 88 and data layers 90. Referring to FIG. 15, a portion of a two-dimensional matrix symbol in the form of an Aztec Code is shown with a finder pattern 62, orientation patterns 86, timing patterns 66, and mode messages 88.

Figure 12:
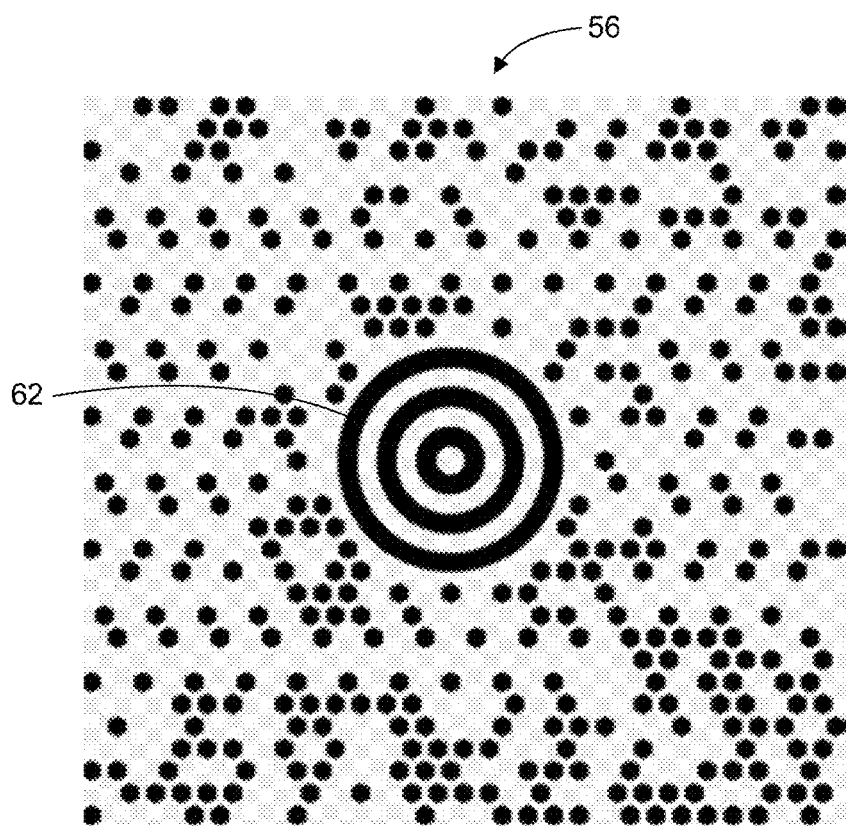
FIG. 12 is an example of a MaxiCode matrix symbol.
Figure 16:
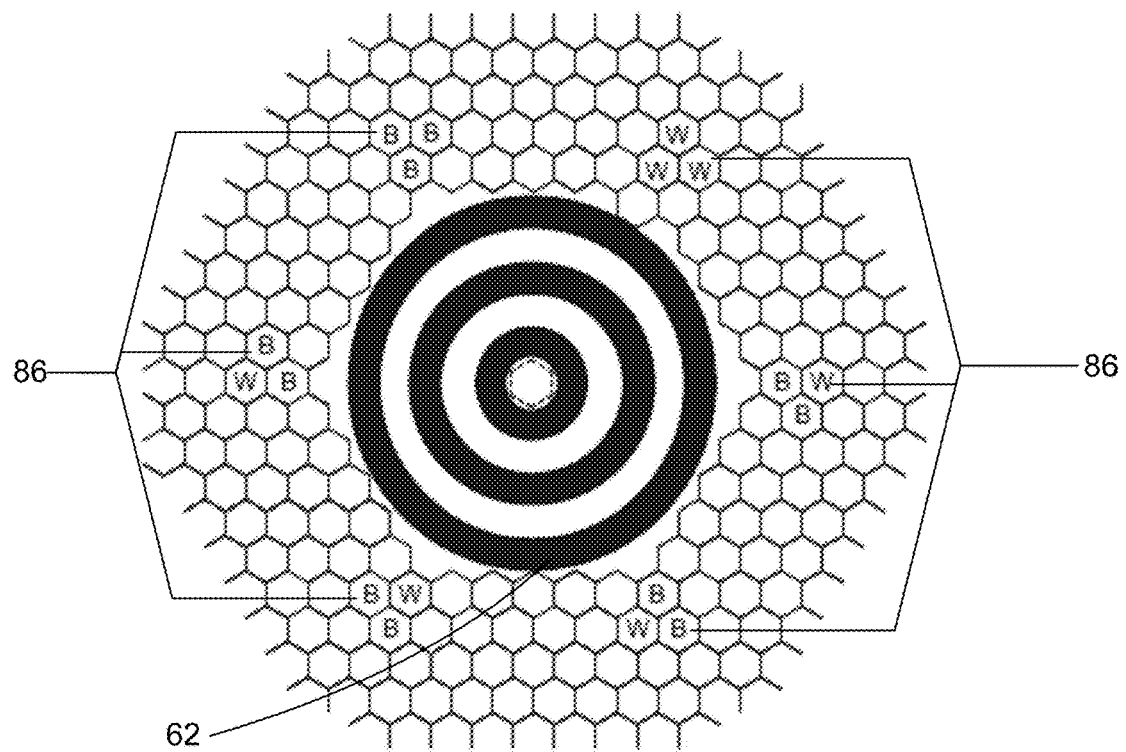
FIG. 16 is a schematic of a fixed pattern portion of a MaxiCode matrix symbol.
Figure 17:
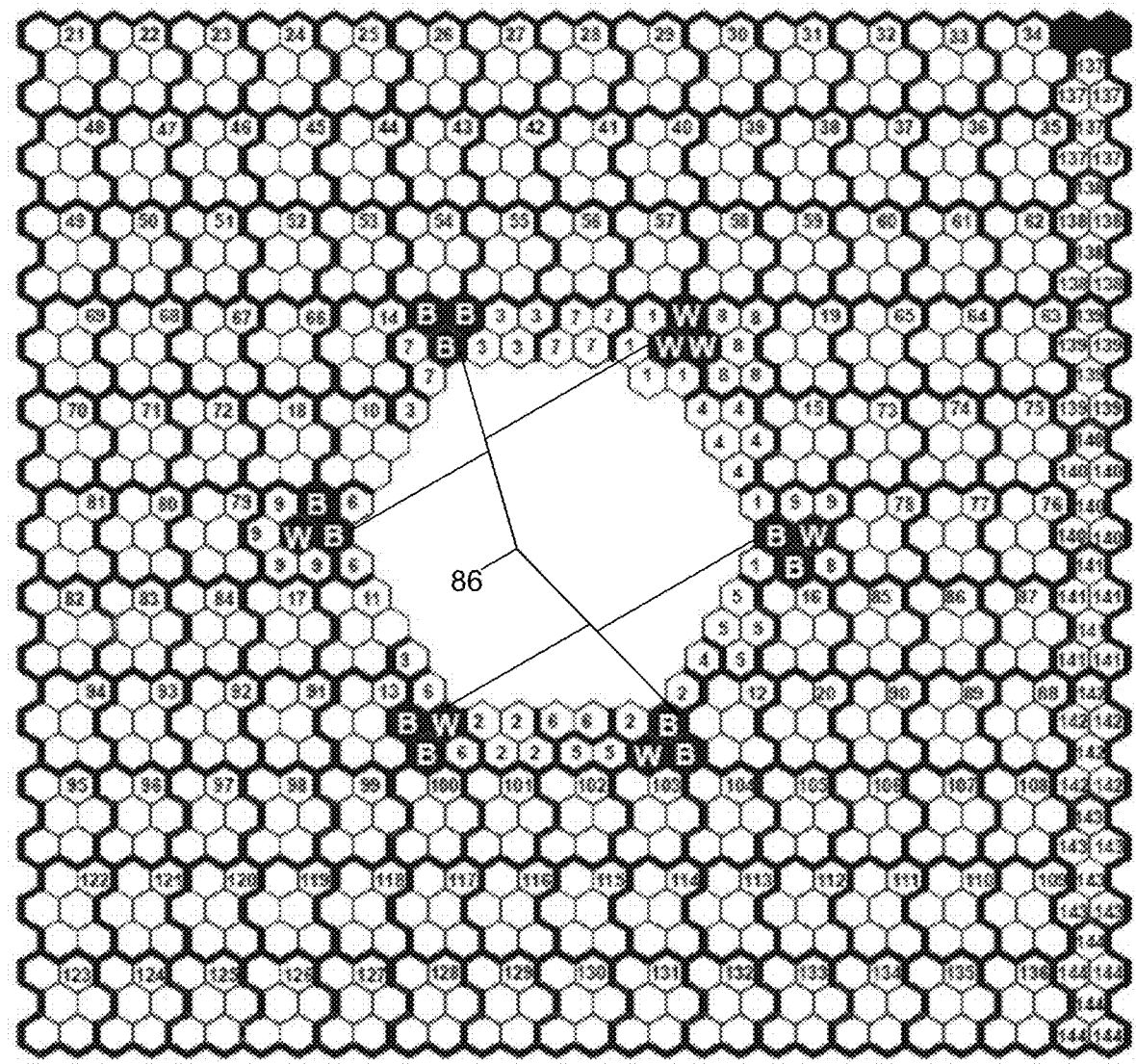
FIG. 17 is a schematic of the data region in a MaxiCode matrix symbol.

Referring to FIG. 12, a two-dimensional matrix symbol 56 in the form of a MaxiCode is shown with a finder pattern 62. Referring to FIG. 16, a portion of a two-dimensional matrix symbol 56 in the form of a MaxiCode is shown with orientation patterns 86 formed by modules denoted by the symbols "B" and "W". Referring to FIG. 17, a two-dimensional matrix symbol 56 in the form of a MaxiCode is shown without a finder pattern and with orientation patterns 86 formed by modules denoted by the symbols "B" and "W" and a character sequence denoted by sequential numerals from 1-144 located within modules.

Figure 9:
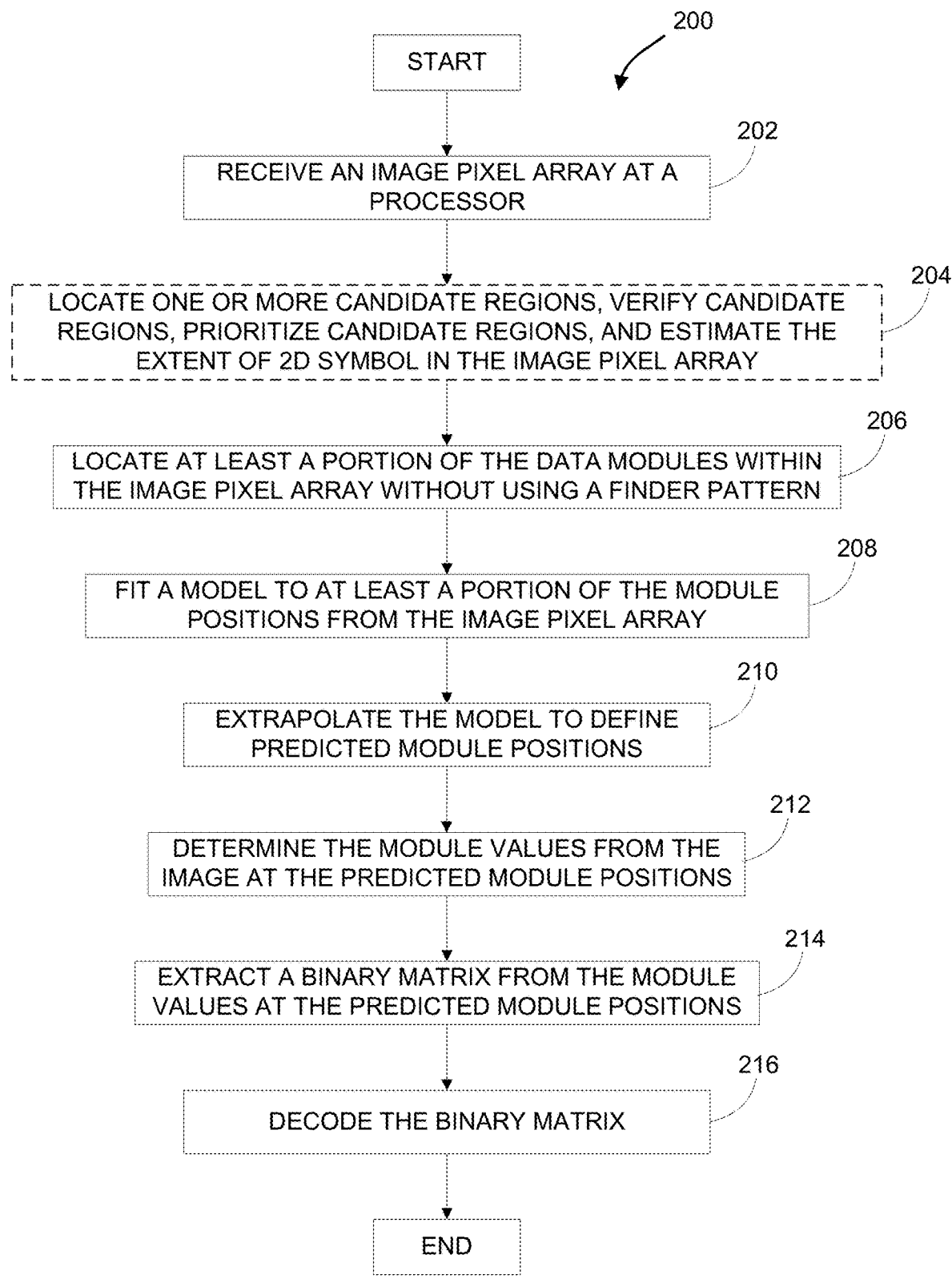
FIG. 9 is a flowchart showing an aspect of a two-dimensional matrix symbol reading method, in accordance with the present disclosure.

Turning to FIG. 9, a flowchart is provided detailing the steps of the method 200 according to this disclosure. The details of the method 200 are described in the paragraphs that follow. The system 30 is configured to execute the method described herein. The system 30 can execute the method by a symbol locating algorithm 74, a module measuring algorithm 100, a matrix decoding algorithm 102, or a combination thereof.

At process box 202, the method 200 can begin with receiving an image pixel array at the processor, the image pixel array containing at least a portion of an image of a two-dimensional matrix symbol captured by the sensor. An image pixel array can be received at the processor by using a camera to acquire an image pixel array that is then transmitted to the processor or by simply receiving an image pixel array file at the processor. The specific means of acquiring the image pixel array is not intended to be limiting to the present disclosure.

The two-dimensional matrix symbol can include data modules each having a module value and a module position. The two-dimensional matrix symbol can include an incomplete fixed pattern or no fixed pattern. The two-dimensional matrix symbol can encode a data set.

Figure 18:
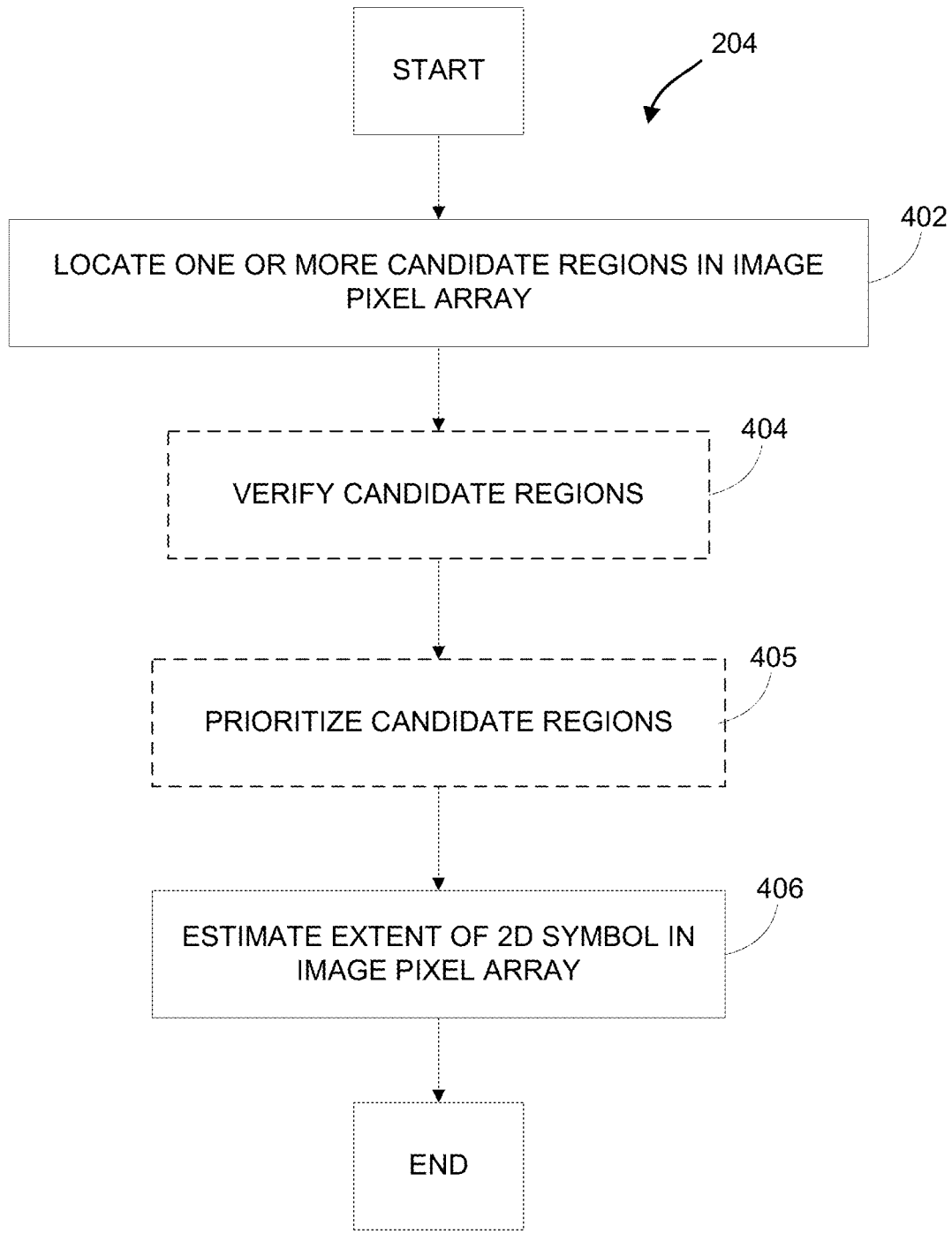
FIG. 18 is a flowchart showing an optional subroutine, in accordance with the present disclosure.

At process block 204, the method 200 can continue by executing an optional subroutine 204 including one or more of the following steps: locating one or more candidate regions; verifying candidate regions; prioritizing candidate regions; and estimating the extent of two-dimensional symbol in the image pixel array, as shown in FIG. 18. Any step or all steps of the optional subroutine 204 can be optional.

Referring to FIG. 18, at process block 402, the optional subroutine 204 can begin by locating one or more candidate regions in the image pixel array. Locating one or more candidate regions can be performed by methods known to those having ordinary skill in the art, such as the methods disclosed in U.S. Pat. No. 7,181,066, which is incorporated herein in its entirety by reference.

At process block 404, the optional subroutine 204 can continue by verifying the one or more candidate regions. Verified candidate regions are more likely to contain a two-dimensional symbol. Verifying the one or more candidate regions can be performed by methods known to those having ordinary skill in the art, such as the methods disclosed in U.S. Pat. No. 7,181,066, which is incorporated herein in its entirety by reference.

At process block 405, the optional subroutine 204 can continue by prioritizing the one or more candidate regions. The prioritization can be based on attributes of the candidate regions including but not limited to size, contrast, edge density, histogram of gradient, other symbologies present in the scene (one-dimensional or two-dimensional), and the like, or the combinations thereof.

At process block 406, the optional subroutine 204 can continue by estimating the extent of two-dimensional symbol in the image pixel array.

In aspects utilizing a handheld scanner as the imaging device, or other aspects where a user is orienting the imaging device relative to the two-dimensional matrix symbol or orienting the two-dimensional matrix symbol relative to the imaging device, it should be appreciated that locating the two-dimensional matrix symbol can be significantly less computationally demanding, because the user is presumably aiming the imaging device at the two-dimensional matrix symbol or aligning the two-dimensional matrix symbol with the imaging device.

Figure 8:
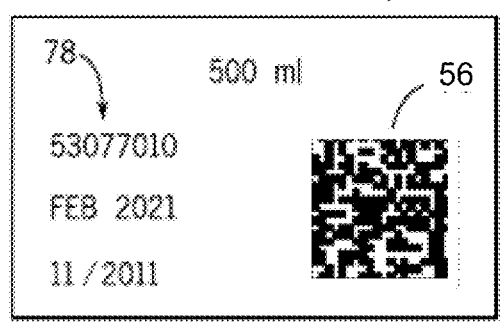
FIG. 8 is a view of a two-dimensional matrix symbol and background clutter in an image.

Referring to FIG. 8, a two-dimensional matrix symbol 56 can be found using a symbol locating algorithm 74. The remaining symbols 78 in the image pixel array 80, e.g., text and numbers, can be considered as background clutter and ignored by the symbol locating algorithm 74 if it does not contain a sufficient number of the features required to be a two-dimensional matrix symbol. Locating the two-dimensional matrix symbol can be performed as part of a general image segmentation technique.

At process block 206, the method 200 can continue by locating at least a portion of the data modules within the image pixel array. Typically in the prior art, locating a two-dimensional matrix symbol is achieved by locating a fixed pattern, but in this case, the fixed pattern is damaged or absent. Locating at least a portion of the data modules can be accomplished with the processor or an auxiliary component. Locating at least a portion of the data modules can include identifying one or more salient features of the data modules including, but not limited to, the shape, the presence or absence of a saddle, the presence or absence of a corner, the presence or absence of a dot, an edge, a gradient, a histogram, a wavelet, or combinations thereof. Locating at least a portion of the data modules within the image pixel array can be performed by methods known to those having ordinary skill in the art, such as the methods disclosed in U.S. Pat. No. 7,181,066 or U.S. patent application Ser. No. 13/797,910, which are incorporated herein in their entirety by reference.

Figure 19:
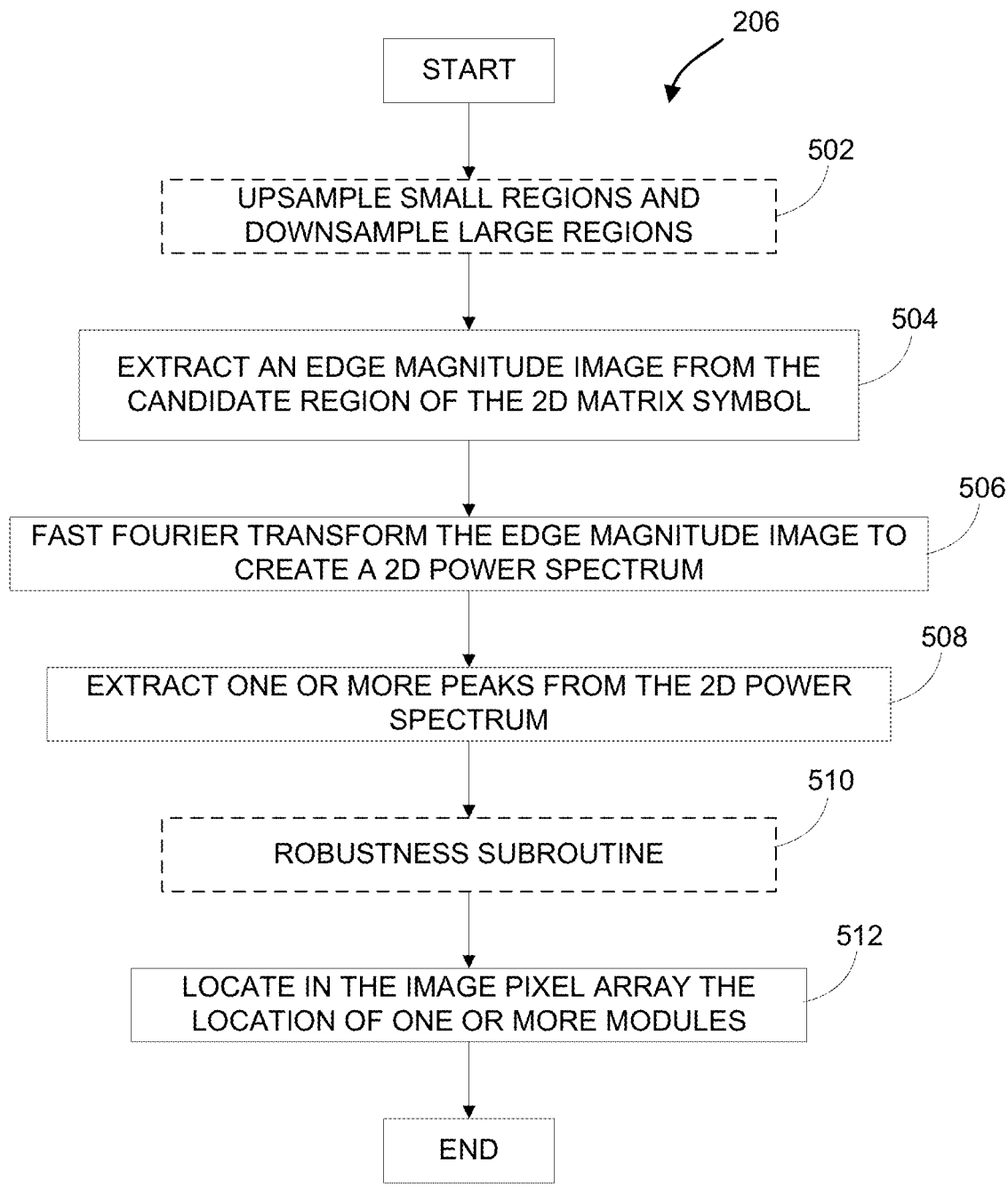
FIG. 19 is a flowchart showing a fitting subroutine, in accordance with the present disclosure.

Referring to FIG. 19, the module locating subroutine 206 can include one or more of the following steps. At process block 502, the module locating subroutine 206 can include optionally upsampling small regions and downsampling large regions, At process block 504, the module locating subroutine 206 can include extracting an edge magnitude image from the candidate region or the two-dimensional matrix symbol. At process block 506, the module locating subroutine 206 can include fast Fourier transforming the edge magnitude image to create a two-dimensional power spectrum. At process block 508, the module locating subroutine 206 can include extracting one or more peaks from the two-dimensional power spectrum, the one or more peaks including a peak defining the principle axis (i.e. orientation) of the two-dimensional matrix symbol, a peak defining the pitch of the two-dimensional matrix symbol, or a combination thereof. It should be noted that due to symmetry in the power spectrum, only a single peak needs to be extracted when the data modules in the two-dimensional matrix symbol are arranged in an evenly spaced array and scanned from an angle normal to the two-dimensional matrix symbol. At process block 510, the module locating subroutine 206 can include optionally executing a robustness subroutine. At process block 512, the module locating subroutine 206 can include locating in the image pixel array the location of one or more modules. In aspects utilizing the robustness subroutine 510, this step determines the offset of the predicted module centers in the image pixel array.

Figure 20:
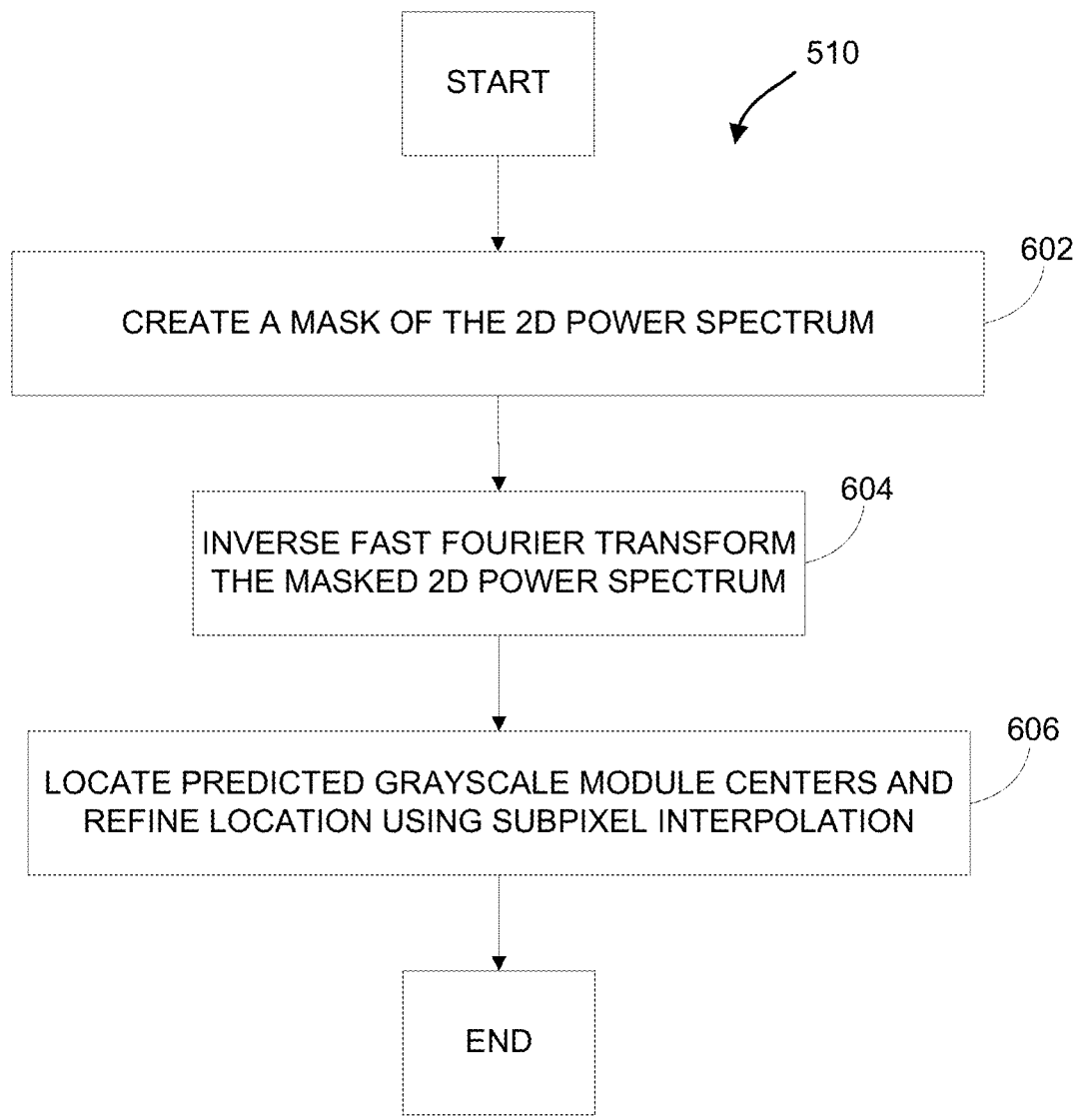
FIG. 20 is a flowchart showing an optional robustness subroutine, in accordance with the present disclosure.

Referring to FIG. 20, the robustness subroutine 510 can include one or more of the following steps. At process block 602, the robustness subroutine 510 can include creating a mask of the two-dimensional power spectrum using the one or more peaks from the power spectrum created at process block 508. At process block 604, the robustness subroutine 510 can include inverse fast Fourier transforming the masked two-dimensional power spectrum to create a grayscale image of predicted module centers. At process block 606, the robustness subroutine 510 can include locating the predicted grayscale module centers relative to the candidate region and refining the location using subpixel interpolation.

In an alternative aspect, the module locating subroutine can include the following: using a dot detector known to those having ordinary skill in the art, such as a Determinant-of-Hessian or Difference-of-Gaussian; estimating orientation, pitch, and offset using at least two dots when two-dimensional matrix row and columns are perpendicular in the image pixel array or at least three dots when two-dimensional matrix row and column modules are not perpendicular, using methods such as random simple consensus (RANSAC), geometric hashing, and the like; and continuing with process blocks 606 or 512. When fewer modules are used to estimate the orientation, pitch and offset, the relative orientation of the located modules will have a significant impact on the accuracy of the estimate of orientation and pitch. Those skilled in the art will recognize that orientation accuracy will be increased when the modules are separated (and accuracy will be decreased when modules are closer) due to the inherent measured positional accuracy of the modules. Similarly the pitch estimation is more accurately derived from modules with greater separation and known offset in matrix row and column.

In certain aspects, other features of the modules can be used in the aforementioned methods, including, but not limited to, edges between foreground and background modules.

At process block 208, the method can further include a fitting subroutine 208 that can include fitting a model to at least a portion of the module positions. Fitting a model to at least a portion of the module positions can be accomplished by techniques known to those having ordinary skill in the art. Fitting a model to at least a portion of the module positions can be done with the processor or an auxiliary component. The model itself can vary based on the type of two-dimensional matrix symbol that is being read (i.e., the model for a two-dimensional matrix symbol where the modules are arranged in a rectangular array would differ from the model for a two-dimensional matrix symbol where the modules are arranged in a hexagonal array). In certain aspects, the model can be a rigidly evenly spaced, a piecewise linear, a perspective, an affine. In certain aspects, the model can be a polynomial or thin-plate-spline, or a deformable template, which can account for other effects such as warping of the mark substrate or poor marking. In certain aspects, the model can be a geometric fitting, which can account for effects such as marking on a non-standard shape (e.g. cylinder). In certain aspects, the model can account for expected variation in mark printing such as continuous ink jet printers which print dots of ink in a raster resulting in highly correlated rows and less correlated columns, or vice versa.

In one non-limiting example of a fitting subroutine 208, a two-dimensional image can be segmented and features (i.e., foreground modules, such as black marks on a white surface or vice versa) can be extracted. It should be appreciated that it is not necessary to extract every feature in order to successfully execute the fitting subroutine 208. Next, a feature near the center of the group of extracted features is chosen. It is assumed that in a small area locally, the modules (foreground and background modules) are aligned with an affine model. Starting from the feature near the center, the features are selected moving outward from the center and the model is built as these features are selected. From the center feature, nearby feature points are identified and a local affine model (for example, a 5×5 modules patch) is estimated. After the local affine model is fit to the nearby feature points, then all feature modules are extracted (foreground and background modules). The next step involves translating this affine model in various directions. The center feature can be defined as [0,0] in an ideal model. Starting from the local affine model discussed above, the affine model is translated one module in various directions (for example, eight different directions: East, East-South, South, South-West, West, West-North, North, and North-East in relation to the local affine model). Once the affine model is translated one module in a direction, an initial estimation of a new local affine model is made. Feature points located near the new local affine model are used to refine the new local affine module. This translation is continued in each direction until no new feature points are identified in a respective new local affine model. Once every direction has been completed and all of the respective correspondences have been identified, a polynomial model can be used to fit the correspondences. It should be appreciated that various rows and/or columns can be extrapolated in order to account for damage that may have occurred to the code.

At process block 210, the method 200 can further include extrapolating the model resulting in predicted module positions. Extrapolating the model can be done with the processor or an auxiliary component. Extrapolating the model can include mapping a dimensionless row/column of the matrix code (2-dimensional x-pitch, x-phase, y-pitch, y-phase) array to the image pixel array. It should be appreciated that the disclosure is not limited to Cartesian or 2-dimensional coordinates and hexagonal, polar, and other coordinate systems are contemplated.

Predicted module positions are the locations relative to the image pixel array where modules could be located to form a complete two-dimensional matrix symbol. It should be appreciated that predicted module positions need not be integer pixel coordinates, so subpixel location is explicitly contemplated. In addition, other coordinate systems with known mapping to an image pixel grid are contemplated, such as a calibrated real-word coordinate system with a known relationship to the image pixel array. When the predicted module positions are located outside the image pixel array, the module values for these positions can be unknown. The decoding binary matrix step can use erasure correction to maximize tolerance to damage due to symbol extending beyond the image pixel array.

At process block 212, the method 200 can further include determining module values from the image pixel array at the predicted module positions. Determining module values can be done with the processor or an auxiliary component. Determining module values can be accomplished by techniques known to those having ordinary skill in the art. For example, the module values can be determined by the Data Matrix Reference Decode algorithm, as shown in ISO/IEC 16022:2006, Section 9. The sampling, or the measuring of module value, can be performed on either a binarized image or a grayscale image (with optional image prefiltering). In certain aspects, sampling can include choosing the pixel with the closet location to the predicted center. In certain aspects, sampling can be grayscale interpolated from the pixels surrounding the predicted center. Determining module values can involve determining whether the module is a foreground or background module (i.e., whether the module is dark or light). In certain aspects, determining module values can include measuring an intensity of reflected light from the module location, where a light module will reflect more light than a dark module. In certain aspects, determining module values can include measuring the depth of the module from a distance sensing device.

In certain aspects, determining module values can optionally include binarizing using methods known in the art. For example, binarizing using a single threshold on a pixel's grey value can be used. As another example, local thresholding designed to accommodate lighting variation across the symbol can be used. In certain aspects, the module value can be the binary value of the pixel closest to the predicted module location.

In other aspects, determining module values can include sampling a value based on the image pixel array and the predicted module location. For example, the original acquired image can be processed, such as using a smoothing filter to reduce noise. Following that, the module value can be the value of the nearest pixel to the predicted module location. Alternatively, the module location can be interpolated from the values of pixels near the predicted module location.

After determining the module values, the module values (raw measurement or binary) can be stored in an array. The array can be larger or smaller than the number of data modules rows and/or columns in the two-dimensional matrix symbol when the estimating the extent of the two-dimensional matrix symbol 406 or the extrapolating step 210 are inaccurate. The array of module values include at least portion of the two-dimensional matrix symbol, and potentially a portion of quiet zone and/or background clutter around the symbol. The array is organized along principal axes of the symbol, but the offset and orientation of the real symbol within this array is undetermined. The storage of the array can be in one-dimensional or two-dimensional or multi-dimensional, that should be obvious to those having ordinary skill in the art.

When determining module values from the predicted module locations and the extent of the symbol is unknown, the exact boundaries of the symbol are disregarded in determining module values. After determining the module values, the module values (raw measurement or binary) can be stored in a one-dimensional or multi-dimensional array including at least portion of the two-dimensional matrix symbol, and potentially portion of quiet zone and/or background clutter around the symbol. The array is organized along principal axes of the symbol, but the offset and orientation of the real symbol within this array is undetermined. The size of the array can range from about 10×10 to about 200×200 modules, with additional rows or columns in embodiments where the exact boundaries of the symbol are unknown. The sizes of these arrays are much smaller than the typical size of an image pixel array, which can have sizes from 640×480 to 2500×1200 pixels or more. In certain aspects, partial fixed patterns can be more easily identified in the array of module values than in the image pixel array. If the symbology is unknown, locating at least a portion of the fixed pattern in the array of module values can be used to differentiate between symbologies.

Figure 21:
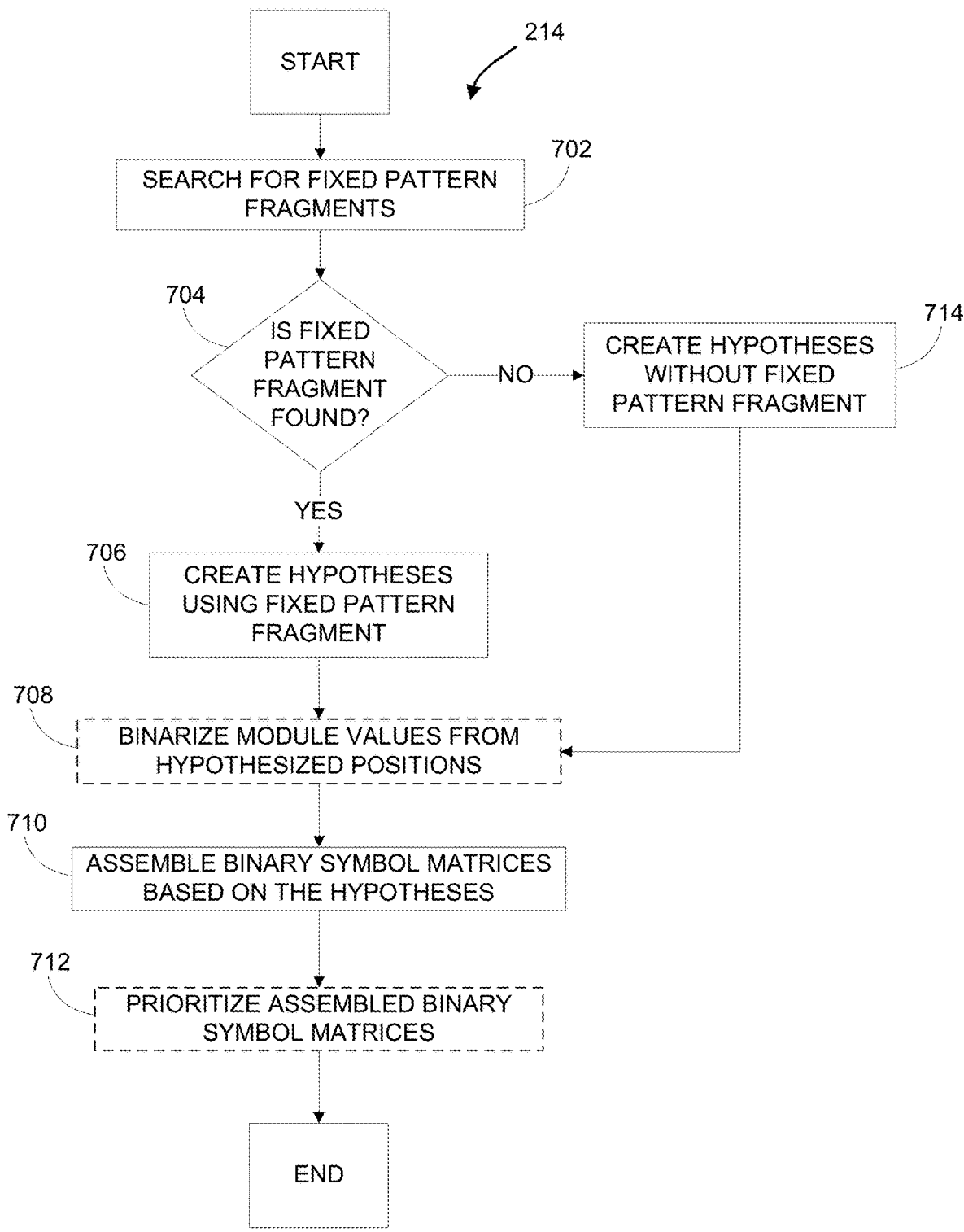
FIG. 21 is a flowchart showing an extracting subroutine, in accordance with the present disclosure.

At process block 214, the method 200 can further include extracting a binary matrix from the array of module values. Extracting a binary matrix can include the following: searching for fixed pattern fragments in the array of the determined module values; creating hypotheses of symbol location within the array of determined module values; optionally binarizing the module values; and assembling a binary symbol matrix by assigning the binarized module values to a hypothesized position in an array of a size corresponding to a two-dimensional matrix symbol size in hypothesized or known rows and columns. Similarly the array can be stored in a one-dimensional or multi-dimensional fashion that should be obvious to those who have ordinary skill in the art As shown in FIG. 21, extracting the binary matrix 214 can include multiple processes and decisions. At process block 702, extracting the binary matrix 214 can include searching for fixed pattern fragments optionally including quiet zone in either the array of module values or the binary matrix. Searching for fixed patterns (locating fixed patterns, if successful) can be done through methods known to those having ordinary skill in the art. Examples include, but are not limited to, correlation, normalized correlation, blob analysis, and the like. At decision block 704, extracting the binary matrix 214 proceeds with process block 706 if a fixed pattern fragment is found or process block 714 if a fixed pattern fragment is not found.

When a fixed pattern fragment is found, at process block 706, extracting the binary matrix 214 can include creating one or more hypotheses using the fixed pattern fragment. At process block 710, extracting the binary matrix 214 can include assembling a binary symbol matrix by assigning the binarized module values to a hypothesized position in an array of a size corresponding to a two-dimensional matrix symbol size in hypothesized or known rows and columns. In some aspects, at process block 712, extracting the binary matrix 214 can optionally involve prioritizing the assembled binary symbol matrices. The prioritization can include evaluating the extent of found fixed pattern fragment, or the extent of located module positions from 206 relative to the extrapolated module positions from 210.

In some aspects where binarization is not part of the determining module values, at process block 708, extracting the binary matrix 214 can optionally include binarizing the module values from the hypothesized positions using methods known in the art. For example, binarizing using a single threshold on a pixel's grey value can be used. As another example, local thresholding designed to accommodate lighting variation across the symbol can be used. In certain aspects, the module value can be the binary value of the pixel closest to the predicted module location.

In some aspects, the hypotheses include position or offset of the binary symbol matrix within the array of module values; the orientation of the binary symbol matrix within the array of module values; the size of the binary symbol matrix in term of symbol rows and columns; the symbology type; the mirrored state; the polarity of the symbol; or a combination thereof. In some aspects, one or more attributes of the size of the binary symbol matrix, the mirrored state, and the polarity of the symbol, can come from a priori knowledge from user input, or from training.

In aspects where at least a portion of a fixed pattern is detected in the module value matrix or the binary matrix, then the portion of the fixed pattern can be used to create one or more hypotheses for attempted decoding. The detection of a fixed pattern in the module value matrix can be done in a raw value matrix in which each value represents a measurement of module intensity or height, or a binary matrix in which each binary bit represents a foreground or background module. The detection method can be one of normalized correlation, binary bit counting, or a combination thereof. As an example, if a 18×18 Data Matrix symbol having a 16×16 data region is identified by the presence of at least a portion of the finder pattern, but the clocking pattern is not observed, then the following hypotheses could be used: hypothesis 1 could predict that the symbology is a 18×18 Data Matrix with missing clocking pattern; hypothesis 2 could predict that the symbol is a 18×18 Data Matrix missing clocking pattern and has a rotation of 90 degree from hypothesis 1; and hypothesis 3 could predict that the symbol is a Data Matrix of size 20×20 or greater missing multiple rows and columns adjacent to the clocking pattern. In certain aspects, hypothesis 3 from this example might not be decodable due to extensive data loss. In certain aspects, the hypotheses are prioritized and the sequence of decoding attempts on the hypotheses is from highest priority (most likely) to lowest priority (least likely). In certain aspects, a subset of hypotheses are attempted. In certain aspects, the prioritization can be based on extent of observed fixed pattern, observed data region histogram, or a combination thereof.

When a fixed pattern fragment is not detected, at process block 714, extracting the binary matrix 214 can include creating one or more hypothesis without using a fixed pattern fragment. In some aspects, at process block 712, extracting the binary matrix 214 can optionally involve prioritizing the assembled binary symbol matrices. The prioritization can include evaluating the extent of located module positions from 206 relative to the extrapolated module positions from 210.

In embodiments where no fixed pattern is observed, multiple hypotheses can be created. The number of hypotheses can vary depending on the computational demand of the hypotheses and the practicality of testing the hypotheses with or without a priori knowledge. As an example, if a 20×20 data region of an unknown symbology is observed, then the following hypotheses could be used: hypothesis 1 could predict that the symbol is a 22×22 Data Matrix with a missing finder and clocking pattern in a certain orientation; and hypothesis 2 could predict that the symbol is a 21×21 QR Code with a damaged finder in a certain orientation; and hypothesis 3 could predict that the symbol is a 24×24 Data Matrix with a missing finder and clocking pattern and some number of adjacent rows and columns. For hypothesis 1 from this example, four distinct orientations of the data region must be tested, as the lack of a fixed pattern means the orientation is unknown. For hypothesis 3 from this example, the missing rows/columns could be the two rows/columns located nearest the finder, the two rows/columns located nearest the clocking pattern, or one row/column nearest the finder and one row/column nearest the clocking pattern. Accordingly, the total number of combinations increases with the scope of hypotheses including multiple symbologies, multiple orientations, and multiple levels of damage. In certain aspects, if the total number of combinations for a hypothesis exceeds a certain number, such as 10, 20, 30, 40, 50, 100, etc., then proceeding with the hypothesis could require too much time for efficient decoding, and the hypothesis might only be pursued if more information is known about the symbols (i.e., training). In certain aspects, the hypotheses are prioritized and the sequence of decoding attempts on the hypotheses is from highest priority (most likely) to lowest priority (least likely). In alternate aspects, only a subset of the possible hypotheses may be attempted. In certain aspects, the prioritization can be based on extent of observed fixed pattern, observed data region histogram, or a combination thereof.

At process block 216, the method 200 can further include decoding the extracted binary matrix. Decoding the binary matrix can be done with the processor or an auxiliary component, such as a binary matrix decoder, configured to execute a decoding algorithm. If the hypothesized module positions in the array of module values are not an accurate representation of the location or orientation of the two-dimensional matrix symbol within the array of module values, then decoding the binary matrix that was extracted from those hypothesized module positions will result in a nonsensical outcome. If the hypothesized module positions are an accurate representation of the module locations within the array of module values, then decoding the binary matrix that was determined from those hypothesized module positions will result in the data set, so long as a sufficient portion of the data modules are included in the decoding.

The decoding step can be repeated on one or more binary matrix extracted based on one or multiple hypotheses from step 214. The sequence can be based on the optional prioritization step in 214.

In certain aspects, decoding the binary matrix can result in the data set.

In certain aspects, decoding the binary matrix can determine whether the binary matrix is decodable. In certain aspects, the decoding algorithm can be a low level decoding algorithm, wherein the binary matrix is not fully decoded to result in the data set, rather the binary matrix is decoded to a level where it is determined whether the binary matrix is decodable. In certain aspects, decoding the binary matrix can include locating a fixed pattern or a portion of a fixed pattern in the binary matrix, when the fixed pattern was not used to locate the two-dimensional matrix symbol, and utilizing the fixed pattern to determine if the binary matrix is decodable. In certain aspects, decoding the binary matrix can include locating a subset of variable code data, such as the primary message of a MaxiCode, QR version information or format information blocks utilizing error detection to determine code size and effective orientation, Aztec encoding information (information on symbol and message size in the data region near the finder pattern), and the like, and utilizing the subset of variable code data to determine if the binary matrix is decodable. In certain aspects, decoding the binary matrix can result in information other than the encoded data set, such as a location of a symbol when the matrix is decodable or a hypothesized symbol location when the matrix is not decodable. The location can be used to carry out quality assessment of the symbol, etc.

The locating, extrapolating, determining, extracting, and decoding steps can be repeated for a number of candidate regions generated at the locating step 204. These steps can be performed on one candidate region at a time or multiple candidate regions at the same time.

The decoding step can be repeated for a number of binary matrices extracted at the extracting step 214. The order of repeating can be based on the prioritization of the hypotheses.

In certain aspects, the extracting and decoding steps can extract and decode multiple symbology types. For example, the extracting and decoding steps can extract and decode symbology types including, but not limited to, Data Matrix, QR-Code, Aztec Code, MaxiCode, and combinations thereof.

In certain aspects, the extracting and decoding steps can prioritize or rank hypotheses according to a user-defined set of criteria and the prioritized or higher ranked hypotheses can be decoded first. For example, a user can define a preferred size of matrix, and hypotheses having the preferred size can be prioritized or ranked higher.

In certain aspects, estimating the extent of two-dimensional symbol can be performed after extracting the binary matrix.

In certain aspects, fragments of fixed patterns can be detected when estimating the extent of two-dimensional symbol.

In certain aspects, estimating the extent of two-dimensional symbol can include observing a quiet zone. The quiet zone is known in the art as an area containing modules with consistent values. This consistency can include variation to account for lighting variation, and the like. In certain aspects, the observed quiet zone may contain variations that do not match the specification for a particular symbology (e.g., a quiet zone having more or less than three modules in certain symbologies). In certain aspects, the observed quiet zone may contain variations that are accidental (e.g., the symbol is printed at the edge of a label). In certain aspects, the observed quiet zone may contain variation that is due to damage or poor lighting eliminating portion of the symbol such as the finder pattern or data region.

In certain aspects, modules can be damaged and decoding the binary matrix 216 can include using erasure in error correction, such as Reed-Solomon error correction, for improved error correction capacity.

The system and method can utilize knowledge of the observed symbols by way of training. "Training" is a method of configuring the reading algorithm with a priori information on attributes of the observed symbol in order to improve robustness and/or execution speed. Attributes can include, but are not limited to symbology, polarity, error correction type, number of rows/columns, module size in pixels, mirrored state, symbol orientation, etc.

Algorithms can be constructed to utilize the trained attributes. For instance knowing the number of rows & columns in the matrix can improve decoding yield on direct-part-mark (DPM) parts in which it may be challenging to determine the number of rows and columns (e.g. by using the clocking pattern in a Data Matrix). By avoiding errors in determination of the number of rows and columns, decode robustness is improved and often the overall execution time to a successful decode is reduced.

Similarly other a priori attributes may affect other elements of the decode algorithm. For example, the expected module size may affect which scale to search for the symbol and may determine image filtering kernel sizes used to improve the image quality (reduce size, improve contrast, remove texture or noise, etc.).

If the processor or algorithm has knowledge of the symbol, such as what size and shape the symbol is expected to take, then locating and extrapolating can be achieved more efficiently. For example, if the system or method is trained to search for an 8×8 grid, then the locating can look more specifically for regions that can cover 8×8 modules or smaller. Similarly, the extrapolating could sample only spaces that are not significantly larger than 8×8 modules.

In certain aspects, estimating the extent of two-dimensional symbol can include using a priori information, such as that measured by training or input by the user.

The method can further include correcting errors in the binary matrix using an error correction routine. The error correction routine can be performed by methods known to those having ordinary skill in the art. For example, the error correction routine can include Block Codes, such as Linear Block Codes including Reed-Solomon, Convolutional Codes, and the like.

The method can further include illuminating the two-dimensional matrix symbol or a location near the two-dimensional matrix symbol. The illuminating can be performed by an illuminator. The illuminating can provide illumination features in the image pixel array. Upon illuminating, the locating step can be based at least partially on illuminating or the illumination features in the image pixel array.

In certain aspects, the method can include locating one or more illumination features in one image pixel array and inferring the location of the one or more illumination features in a separate image pixel array, for example, by determining the location of the one or more illumination features relative to a landmark that can be identified in both image pixel arrays. This allows the illuminating to be disabled during an exposure in which an image to be decoded is exposed. Alternatively, the location of the one or more illumination features can be known prior to acquiring the image, for example, by determining where the illumination feature reproducibly appear within an image pixel array (e.g., at the center of the image, at a position measured at stored in memory at manufacturing time, etc.).

In certain aspects, the method can be executed by a single command or multiple commands to the processor. The single command or multiple commands can be provided by a user or can be automatically triggered to be provided by the processor or an auxiliary component.

In certain aspects, the fixed pattern can be incomplete because part of the finder pattern is along the right edge of a paper and cannot be distinguished from a dark background. In certain aspects, the fixed pattern can be incomplete because part of the finder pattern is simply absent, specifically, in the upper left portion of the symbol.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A system for reading a two-dimensional matrix symbol including data modules each having a module value and a module position, the two-dimensional matrix symbol encoding a data set, the system comprising:
    an imaging device, the imaging device configured to acquire an image containing at least a portion of the two-dimensional matrix symbol;
    a processor, the processor operatively coupled to the imaging device, the processor configured to execute a data reading algorithm, wherein the data reading algorithm receives the image, locates at least a portion of the data modules within the image, predicts predicted module positions based on alignment and position of the at least a portion of the data modules, wherein the predicted module positions have sufficient data modules to attempt decoding, determines module values from the image at the predicted module positions, and extracts a binary matrix from the module values; and
    a binary matrix decoder operatively coupled to the processor, the binary matrix decoder configured to execute a decoding algorithm that decodes the binary matrix.

2. The system of claim 1, wherein the data reading algorithm corrects errors in the binary matrix using an error correction routine.

3. The system of claim 1, wherein the system includes an illuminator that illuminates a target of the image with one or more illumination features.

4. The system of claim 3, wherein the data reading algorithm uses the illumination features to locate at least a portion of the data modules within the image.

5. The system of claim 1, wherein locating at least a portion of the data modules includes identifying one or more salient features of the data modules selected from the group consisting of shape, the presence or absence of a saddle, the presence or absence of a corner, the presence or absence of a dot, a gradient, a histogram, a wavelet, and combinations thereof.

6. The system of claim 1, wherein the processor or binary matrix decoder are configured to extrapolate or decode multiple symbology types.

7. The system of claim 6, wherein the multiple symbology types are selected from the group consisting of Data Matrix, QR-Code, Aztec Code, MaxiCode, and combinations thereof.

8. The system of claim 1, wherein the data reading algorithm includes attributes of the two-dimensional matrix symbol.

9. The system of claim 1, wherein the data reading algorithm can be executed by a single command to the processor.

10. A method of reading a two-dimensional matrix symbol including data modules each having a module value and a module position, the two-dimensional matrix symbol encoding a data set, the method comprising:
   receiving an image at a processor, the image containing at least a portion of the two-dimensional matrix symbol;
   locating, using the processor, at least a portion of the data modules within the image;
   predicting, using the processor, predicted module positions based on alignment and position of the at least a portion of the data modules, wherein the predicted module positions have sufficient data modules to attempt decoding;
   determining, using the processor, the module values from the image at the predicted module positions;
   extracting, using the processor, a binary matrix from the module values; and
   decoding the binary matrix.

11. The method of claim 10, the method further comprising correcting, using the processor, errors in the binary matrix using an error correction routine.

12. The method of claim 10, the method further comprising illuminating the two-dimensional matrix symbol or a location near the two-dimensional matrix symbol.

13. The method of claim 10, wherein locating at least a portion of the data modules includes identifying one or more salient features of the data modules selected from the group consisting of shape, the presence or absence of a saddle, the presence or absence of a corner, the presence or absence of a dot, a gradient, a histogram, a wavelet, and combinations thereof.

14. The method of claim 10, wherein the method includes attempting to extrapolate or decode multiple symbology types.

15. The method of claim 14, wherein the multiple symbology types are selected from the group consisting of Data Matrix, QR-Code, Aztec Code, MaxiCode, and combinations thereof.

16. The method of claim 10, the method further comprising training the processor to contain one or more attributes of the two-dimensional matrix symbol prior to receiving the image.

17. The method of claim 10, wherein the method can be executed by a single command to the processor.

18. A system for determining if a two-dimensional matrix symbol is decodable, the two-dimensional matrix symbol including data modules each having a module value and a module position, the system comprising:
   an imaging device, the imaging device configured to acquire an image containing the two-dimensional matrix symbol;
   a processor, the processor operatively coupled to the imaging device, the processor configured to execute a data reading algorithm, wherein the data reading algorithm receives the image, locates at least a portion of the data modules, predicts predicted module positions based on alignment and position of the at least a portion of the data modules, wherein the predicted module positions have sufficient data modules to attempt decoding, determines module values from the image at the predicted module positions, and extracts a binary matrix from the module values, wherein the data reading algorithm includes a frequency-domain analysis.

19. The system of claim 18, wherein the data reading algorithm fits the model using a frequency-domain analysis.

20. The system of claim 18, wherein the system further comprises a binary matrix decoder operatively coupled to the processor, the binary matrix decoder configured to execute a decoding algorithm that decodes the binary matrix.

* * * * *